(12) United States Patent
Thomas (10) Patent No.: US 8,695,214 B2
(45) Date of Patent: Apr. 15, 2014

(54) LAYING NETWORK CABLES IN WATER SUPPLY PIPES

(75) Inventor: Elfed Thomas, Llandudno (GB)

(73) Assignee: CMS (Cable Management Supplies) PLC. a Company of the United Kingdom, Farnborough, Hampshire (GB)

( * ) Notice: Subject to any disclaimer, the term of this patent is extended or adjusted under 35 U.S.C. 154(b) by 299 days.

(21) Appl. No.: 13/063,493

(22) PCT Filed: Sep. 11, 2009

(86) PCT No.: PCT/GB2009/051172
§ 371 (c)(1),
(2), (4) Date: Oct. 4, 2011

(87) PCT Pub. No.: WO2010/029365
PCT Pub. Date: Mar. 18, 2010

(65) Prior Publication Data
US 2012/0012386 A1    Jan. 19, 2012

(30) Foreign Application Priority Data
Sep. 11, 2008    (GB) .................................. 0816616.7

(51) Int. Cl.
*H01R 43/00*    (2006.01)
*H05K 13/00*    (2006.01)

(52) U.S. Cl.
USPC ............... 29/854; 29/237; 138/108; 138/109; 138/114; 285/125.1; 285/131.1; 285/132.1; 385/45; 385/100; 385/101; 385/147; 174/47

(58) Field of Classification Search
USPC .................... 29/854, 237; 138/108, 109, 114; 285/125.1, 131.1, 132.1; 385/45, 100, 385/101, 147; 174/47
See application file for complete search history.

(56) References Cited

U.S. PATENT DOCUMENTS

| | | | |
|---|---|---|---|
| 5,971,035 | A | 10/1999 | Griffioen |
| 6,019,351 | A | 2/2000 | Allen |
| 6,584,252 | B1 | 6/2003 | Schier |
| 2001/0010136 | A1 | 8/2001 | Nakamura |
| 2003/0068143 | A1 | 4/2003 | Martinez et al. |

FOREIGN PATENT DOCUMENTS

| | | |
|---|---|---|
| GB | 2267005 A | 11/1993 |
| SE | 8601034 A | 9/1987 |

*Primary Examiner* — Peter DungBa Vo
*Assistant Examiner* — Jeffrey T Carley
(74) *Attorney, Agent, or Firm* — Barlow, Josephs & Holmes, Ltd.

(57) ABSTRACT

A network and method of laying network cables in water supply pipes is disclosed. A building is situated near a roadway along which is laid a trunk cable. A water supply pipe branches off the water main to enter the building. A water supply pipe is provided at the time of construction of the building and is an underground pipe. It is conventional to provide a dedicated (and usually underground) conduit for a branch cable, which is expensive and disruptive. In the present invention the branch cable is laid along water supply pipe, enabling the cable to cross between the trunk cable and the building with minimal disturbance of the ground therebetween. This is achieved by introducing cable to pipe by use of a suitable Y-junction at location and removing the cable from the pipe by use of a second such Y-junction at location.

21 Claims, 8 Drawing Sheets

LAYING NETWORK CABLES IN WATER SUPPLY PIPES

The present invention relates to the laying of cables in water supply pipes.

In order to install a new node to a hardwired network or indeed to provide a new hardwired network, it is necessary to provide a cable linking the node to the various other nodes in the network. Often, such as in the case of cable television networks, this will require providing a branch cable connecting the new node to an existing trunk cable via which connection to the other nodes may be effected. The trunk cables will typically be laid in a pattern between one or more potential nodes, for instance the trunk cables may follow the local street pattern. The branch cables may then need to travel some distance from the trunk cable to reach the building in which the node is to be located.

In order to allow the cable to traverse such distances a dedicated conduit may be required. In some locations this distance may be relatively short, for instance in city centres and thus fitting a dedicated conduit is relatively low in cost and low in disruption. In other locations this distance may be longer or may cross private property. In such locations, the cost of providing a conduit and/or the disruption caused by digging up the private property to lay the conduit may be prohibitive. For instance in many suburban locations connection to a cable television network requires a cable conduit to be laid across a homeowner's front garden from a trunk cable running along or alongside the public roadway. This can require the digging of a trench through the garden which may be sufficiently expensive and/or unsightly to dissuade the homeowner from ordering a connection to the network.

It is therefore an object of the present invention to provide a new method of laying a branch cable between a trunk cable and a node location that alleviates or overcomes the above problems.

According to a first aspect of the present invention there is provided a method of laying a branch cable between a trunk cable and a desired node location comprising the steps of: locating a pre-existing pipe for the node location adjacent to the trunk cable; introducing the branch cable into the pre-existing pipe; passing the branch cable along the pre-existing pipe; and removing the branch cable from the pre-existing pipe adjacent to the node location.

In this manner, a branch cable can pass from a trunk cable to a node location without providing a dedicated conduit.

The pre-existing pipe may be a water supply pipe. Additionally or alternatively, the pre-existing pipe may be a drain, a waste water pipe or sewer.

The method may further comprise the steps of connecting the branch cable to the trunk cable and/or connecting the branch cable to the node. The branch cable may be connected directly to the trunk cable or may be connected via suitable junction box. The branch cable may enter the water supply pipe adjacent to the junction box. The branch cable may travel along a suitable conduit such as a microtrench or other conventional conduit between the junction box and the pre-existing pipe. The branch cable may be connected directly to suitable equipment at the node or may be connected to a junction box or socket allowing one or more devices to be connected to the network.

The cable may be removed from the pre-existing pipe adjacent to a building within which the node is provided. In such embodiments, the cable may then be passed through a suitable entry passageway to be connected to the node within the building. Additionally or alternatively, the cable may be removed from the pre-existing pipe within a building within which the node is provided. The cable may enter and leave the pre-existing pipe between a mains side stopcock and a dedicated building stopcock.

The method may include the steps of providing a cable transfer means enabling a cable to be introduced to or removed from said pre-existing pipe. The cable transfer means may comprise a Y-junction inserted into a gap provided in the pre-existing pipe. The leg and one arm of the Y-junction may be open and having an open end adapted to be connected to the pre-existing pipe thereby providing a water flow path through the Y-junction. The open arm and the leg of the Y-junction may be provided in along a common linear axis. The arms and the leg may be of substantially similar dimensions. Alternatively, the open arm and the leg may differ in dimensions from the other arm. In particular, the other arm may be narrower than the open arm and leg. The other arm may be capped with an end closure having a cable passage provided therethrough.

The cable passage is preferably adapted to allow the passage of a cable but prevent the passage of water alongside said cable. This can be achieved by forming the passage from resiliently deformable material. The diameter of the passage may be matched to the expected cable diameter. In such cases the diameter of the passage may be selected to be equal to or less than the expected diameter of the cable, such that when deformed a watertight seal is maintained.

In some embodiments, the cable may be threaded along a microduct tube. In such embodiments, the cable passage is preferably adapted to allow the passage of a microduct tube but prevent the passage of water alongside said microduct tube. This can be achieved by forming the passage from resiliently deformable material. The diameter of the passage may be matched to the expected microduct tube diameter. In such cases the diameter of the passage may be selected to be equal to or less than the expected diameter of the microduct tube, such that when deformed a watertight seal is maintained.

In further embodiments, the cable passage may be adapted to allow the passage of a bundle of cables.

The open leg and arm of the Y-junction may be connected to the pre-existing pipe via suitable fittings. The fitting is preferably adapted to seal the Y-junction to the pre-existing pipe. The fitting may be a push fitting or a compression fitting and in particular may be a BSP or metric compression fitting.

The method may incorporate the steps of forming a suitable gap in the pre-existing pipe. The gap may be formed by use of suitable cutting equipment. The method may incorporate the step of prior to forming the gap, turning off the water supply to the pre-existing pipe. This can make fitting the Y-junction simpler and minimise the water leakage and disruption caused by fitting the Y-junction.

The Y-junction may be formed from any suitable material. Typically it may be formed from a suitable metal, plastic or ceramic substance.

The cable may be any suitable form of cable. The cable is preferably provided with a suitable insulating coating. The cable may be an optical fibre. The fibre may have a single core or multiple cores. In one preferred embodiment the fibre may have 2-4 cores.

The trunk cable may be laid in a dedicated conduit or may be laid along a sewer. In particular, the trunk cable may be laid according to the disclosure of our co-pending application WO2008/009969. In this prior application there is provided a method of laying a cable between two points comprising the steps of: laying a cable through one or more lengths of sewer between the two points; and where there is no convenient length of sewer or a gap between convenient lengths of sewer, providing a length of dedicated cable conduit between said lengths of sewer and laying said cable through said dedicated cable conduit. In this context, it should be understood that in addition to or in place of sewers, cables may be laid along water supply pipes, roadside drains, storm drains or similar.

The cable may be laid through the sewer using any suitable technique. The techniques may include, but are not limited to: laying the cable loose in the flow channel of the sewer; pinning the cable to the walls of the sewer; or passing the cable through a duct provided in the sewer.

In embodiments wherein the method involves laying the cable loose in the flow channel of a sewer, the method may include the step of installing a suitable cable guide at points wherein the cable is desired or required to enter or leave the flow channel. The cable guide is preferably adapted to enable the cable to enter/exit the flow channel without significantly impeding the flow. The cable guide may comprise a body section and an arm section, the body section adapted to lie substantially flush with the wall of the flow channel and the arm section providing a passage for the cable between the flow channel and a point outside the flow channel. Such cable guides may be installed at points wherein the cable is required to enter or leave the sewer and on either side of points such as junctions or bends in the sewer wherein a cable in the flow channel is likely to lie across the direction of flow. In such areas, the cable may be laid outside the flow channel using any suitable other technique such as pinning the cable to the walls of the sewer; or passing the cable through a duct provided in the sewer.

In embodiments wherein the method involves passing the cable through a duct provided in the sewer, the method may involve the additional step of installing a suitable duct. In alternative embodiments, the duct may be pre-installed in the sewer at the time of constructing the sewer. The duct may be pinned or otherwise affixed to the walls or ceiling of the sewer. The duct may be substantially continuous between the cable entry point and the cable exit point or may be comprised of a plurality of separate sections having gaps therebetween.

The cable conduit may be provided by any suitable technique. Typically, this might involve digging a trench, laying the cable in the trench and filling the trench. The cable may be laid in ducting provided at the bottom of the trench. The trench may be filled in layers. In particular, the trench may be filled with a sand layer directly over the cable and a layer of hard core over the sand. A layer of concrete, tarmac, asphalt, bitumen or other suitable sealing/paving surface may be provided over the hardcore if required or desired. The method may further include laying a warning tape between the sand and the hard core layers. The warning tape is adapted to be detectable by the provision of a metal strip inlay and/or being printed with a visible warning. The provision of a metal strip allows the tape to be detected by the a scan of the area using an inductive detector. This may be routinely carried out prior to road excavation. The visible warning may comprise bright colours and/or distinctive patterns and/or a written warning message such as "Warning Fibre Cable", or similar.

The cable may exit the sewer by any suitable means. Preferably, the cable will exit the sewer via a duct into the space below an access hatch or 'manhole'.

Preferably, sealing means may be provided at points wherein the cable exits a sewer, to prevent the escape of noxious gases from the sewer. In some embodiments, sealing means may be provided at both ends of a duct carrying the cable between the sewer and the dedicated conduit.

The sealing means may be of the type comprising: a body having an exterior adapted to fit the aperture through which the cable exits the sewer; and a passage through the body allowing the passage of said cable wherein the body is formed from a resiliently deformable material such that it forms a substantially air tight seal around the cable and a substantially airtight seal between the exterior of the body and the aperture.

One or both ends of the sealing means may be adapted to make it easier to insert a cable. This may be achieved by adapting one or both ends to provide a recessed stepped end portion, a projecting stepped end portion or any other suitable adaptation.

The sealing means may be adapted to fit a duct leading the cable away from the sewer. The sealing means may be retained in the duct with the aid of a suitable adhesive, such as an epoxy resin or similar. Additionally or alternatively the cable may be retained in the sealing means with the aid of a suitable adhesive, such as an epoxy resin or similar. Advantageously, the adhesive is adapted to cure rapidly, even in the presence of water. The adhesive may also aid the formation of a substantially airtight seal.

According to a second aspect of the present invention there is provided a cable transfer means suitable for introducing or removing a cable form a pre-existing pipe comprising: Y-junction having a leg having an open end adapted to be connected to a pre-existing pipe; one arm having an open end adapted to be connected to a pre-existing pipe; and another arm capped with a sealing cap having a cable passage provided therethrough.

The method of the second aspect of the present invention may incorporate any or all of the features described in relation to the method of the first aspect of the present invention as desired or as appropriate.

According to a third aspect of the present invention there is provided a network comprising: one or more cables laid along pre-existing pipes in accordance with the method of the first aspect of the present invention and/or one or more cables introduced to or removed from pre-existing pipes using a cable transfer means in accordance with the second aspect of the present invention.

The network of the third aspect of the present invention may incorporate any or all of the features described in relation to the first or second aspects of the present invention as desired or as appropriate.

The cables may be introduced to and/or removed from the pre-existing pipes by Y-junctions in accordance with the second aspect of the present invention.

The network can be used for any data. The cables within the network may be adapted to carry electrical or optical data signals and may thus be electrical data cables or fibre optic cables as required.

In order that the invention can be more clearly understood it is now described further below with reference to the accompanying drawings.

Figure 1:
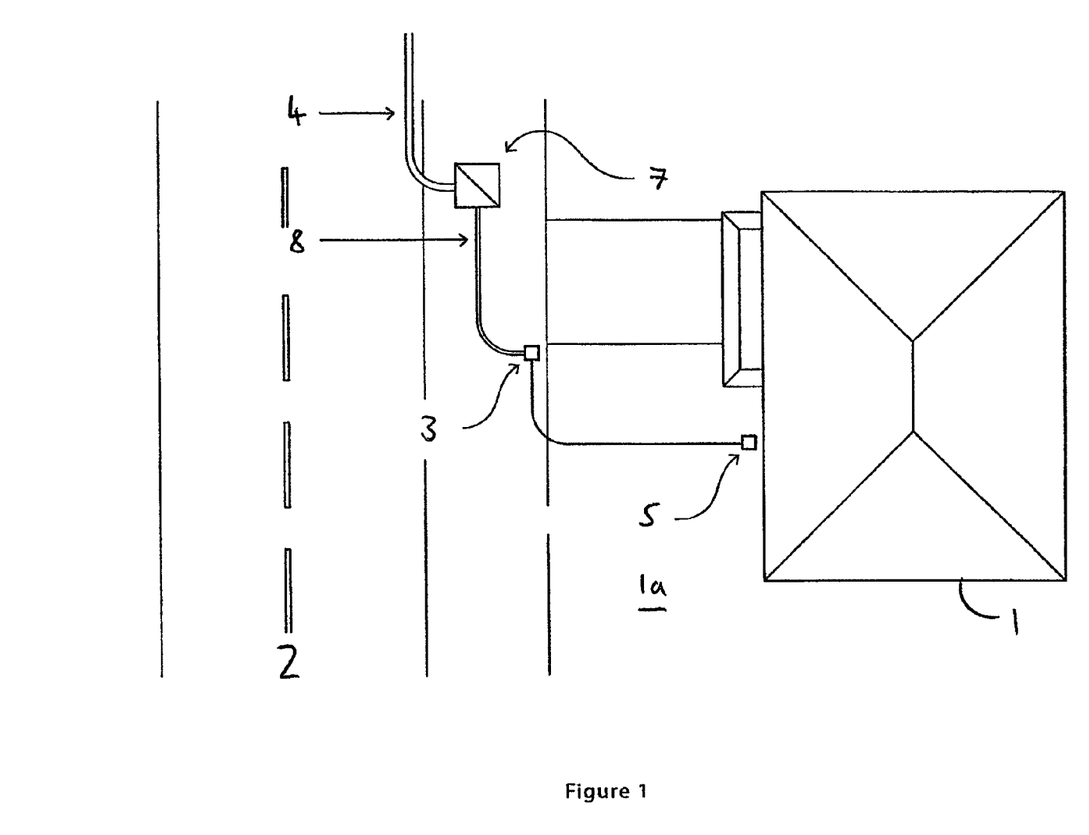
FIG. 1 is a schematic plan view of the provision of an individual pre-existing pipe for a property wherein a branch cable is laid to the property along the pre-existing pipe.
Figure 2:
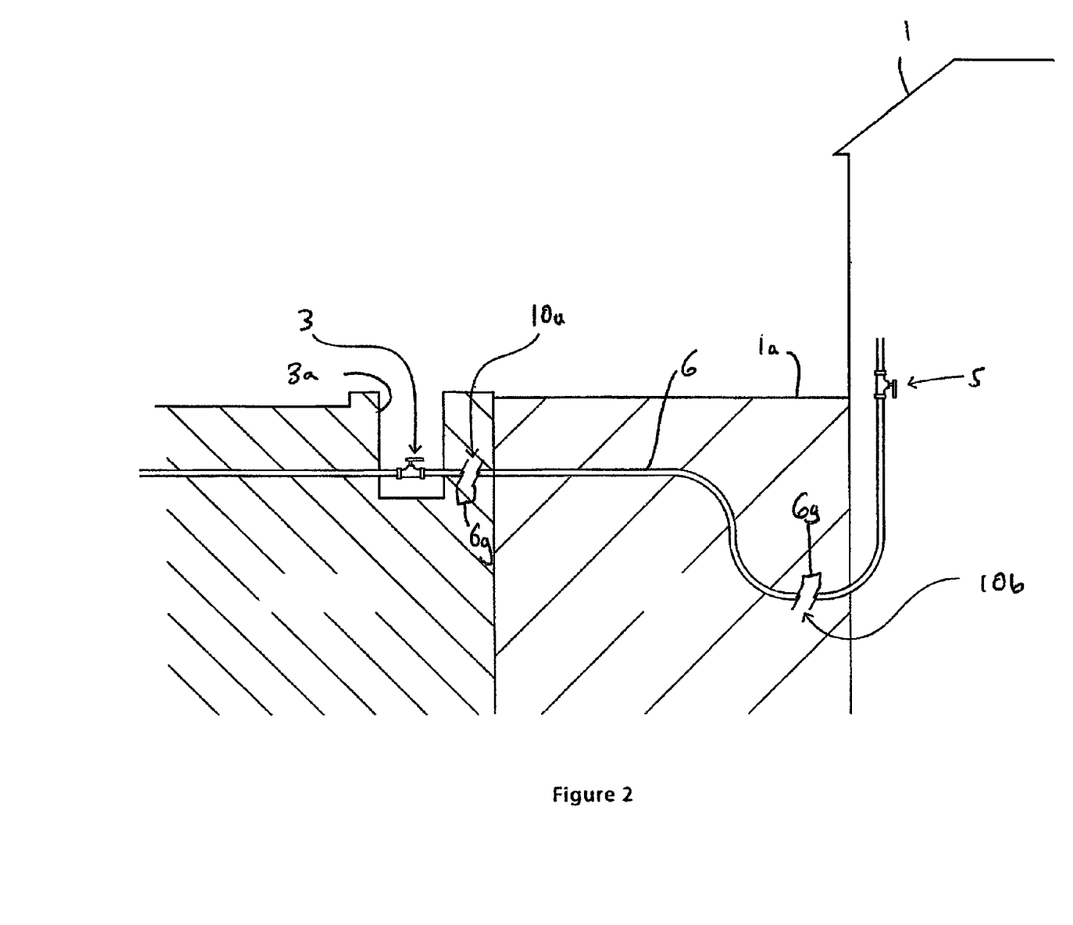
FIG. 2 is a schematic cross-sectional view of the provision of an individual pre-existing pipe for a property wherein a branch cable is laid to the property along the pre-existing pipe.

Referring now to FIGS. 1 and 2, a building 1 is situated in the vicinity of a public roadway 2. Alongside the public roadway 2 are laid a water main (not shown) and a trunk cable 4. An individual property water supply pipe 6 branches off the water main to enter the building 1. The pipe 6 thus provides a supply of water for use within building 1. The flow of water within the pipe 6 is controlled by pavement stopcock 3 provided within a covered hole 3a and building stopcock 5 provided within building 1.

Similarly, at junction box 7 a branch cable branches off trunk cable 4 and continues to enter building 1. The branch cable thus provides a connection between one or more nodes in building 1 and external nodes connected directly or indirectly to trunk cable 4.

The trunk cable 4 may be laid along a dedicated conduit or a convenient length of sewer, water supply pipe or storm drain as appropriate. The trunk cable 4 is typically part of a network comprising one or more trunk cables 4 wherein the or each trunk cable 4 is laid along dedicated conduit and/or convenient lengths of sewer, water supply pipe or storm drain as required.

Figure 5:
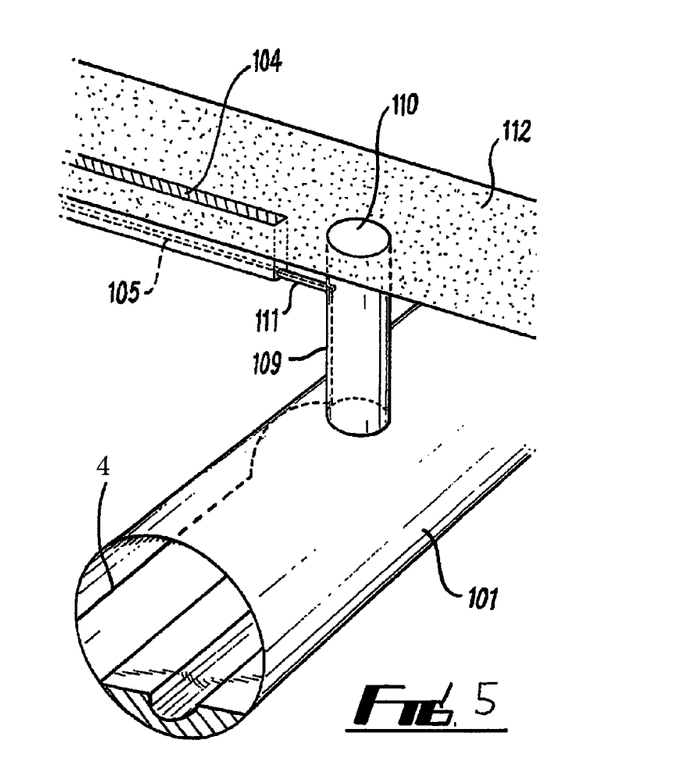
FIG. 5 is a schematic view illustrating the transition of a trunk cable between sewer and trench.

FIG. 5 illustrates schematically, how a trunk cable 4 may pass between a sewer branch 101 (for example) and a trench 104. The Trench 104 may enable the cable 4 to exit the sewer 101 and travel to the junction box 7. In the drawing, the cable 4 is shown fixed to the side of the sewer 101, however it need not be fixed there and may in alternative solutions be fixed or laid freely in another position within the sewer 101. The cable 4 exits the sewer branch 101 along an access shaft 109 and then along a duct 111 into trench 104. In the example shown, the access shaft 109 is provided with a cover 110 and is situated in roadway 2.

Figure 4A:
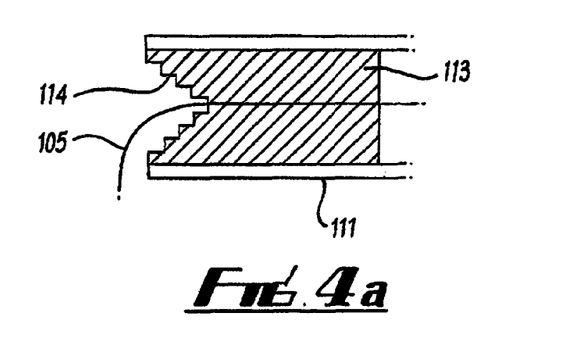
FIG. 4a is a cross-sectional view of one end of a sealing means according to the present invention.
Figure 4B:
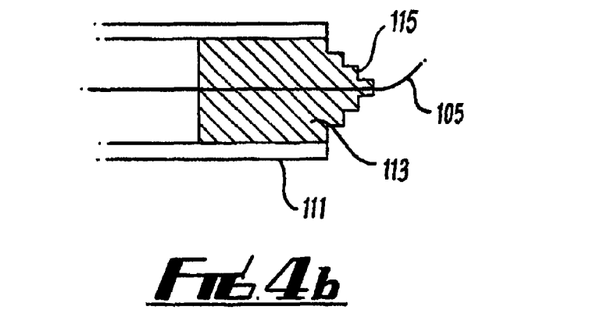
FIG. 4b is a cross-sectional view of an alternative embodiment of one end of a sealing means according to the present invention.

In order to prevent the escape of noxious gases from the sewer 101 along duct 111, suitable sealing means 113 may be provided. The sealing means 113 is adapted to form a substantially airtight seal between its exterior surface and the interior surface of duct 111, as is shown in FIGS. 4a and 4b. The sealing means 113 is also provided with a central passageway through which trunk cable 4 may pass. The passageway is adapted to form a substantially airtight seal around the trunk cable 4. The sealing means 113 is formed from a resiliently deformable material, such that it can compensate for small irregularities on its exterior, on the interior of the duct 111, on the passageway or on the trunk cable 4, to maintain a seal. In some embodiments, a suitable adhesive, such as an epoxy resin, may be applied to the exterior to help retain the sealing means 113 within duct 111. Additionally or alternatively, the adhesive may be applied in the passageway around cable 105 to help retain the trunk cable 4 in place. The adhesive may also help maintain a substantially airtight seal where it is applied.

In a conventional scenario, the water supply pipe 6 is provided at the time of construction of the building 1 and is an underground pipe (as is the main). The cable may however be provided much later. As such, it is conventional to provide a dedicated (and usually underground) conduit for cable. This can however be expensive and disruptive. This may be a particular problem if the cable has to cross a garden la that the owner of building 1 is loathe to see disturbed.

Accordingly, in the present invention the cable is laid along water supply pipe 6. This allows the cable to cross between the trunk cable 4 and the building 1 with minimal disturbance of the ground therebetween. This is achieved by introducing cable to pipe 6 by use of a suitable Y-junction 10 at location 10a and removing the cable from the pipe 6 by use of a second such Y-junction 10 at location 10b. It is of course alternatively possible to lay the cable in any other convenient length of pre-existing pipe such as a waste water pipe or a sewer.

In the event that the junction box 7 is not provided directly adjacent to the covered hole 3a, a microtrench 8 may be provided to carry the cable from junction box 7. The microtrench 8 may comprise a filled trench with the cable at its base. The filled trench may have a depth of say 150 mm or so and a width of say 20-30 mm or so.

Figure 3A:
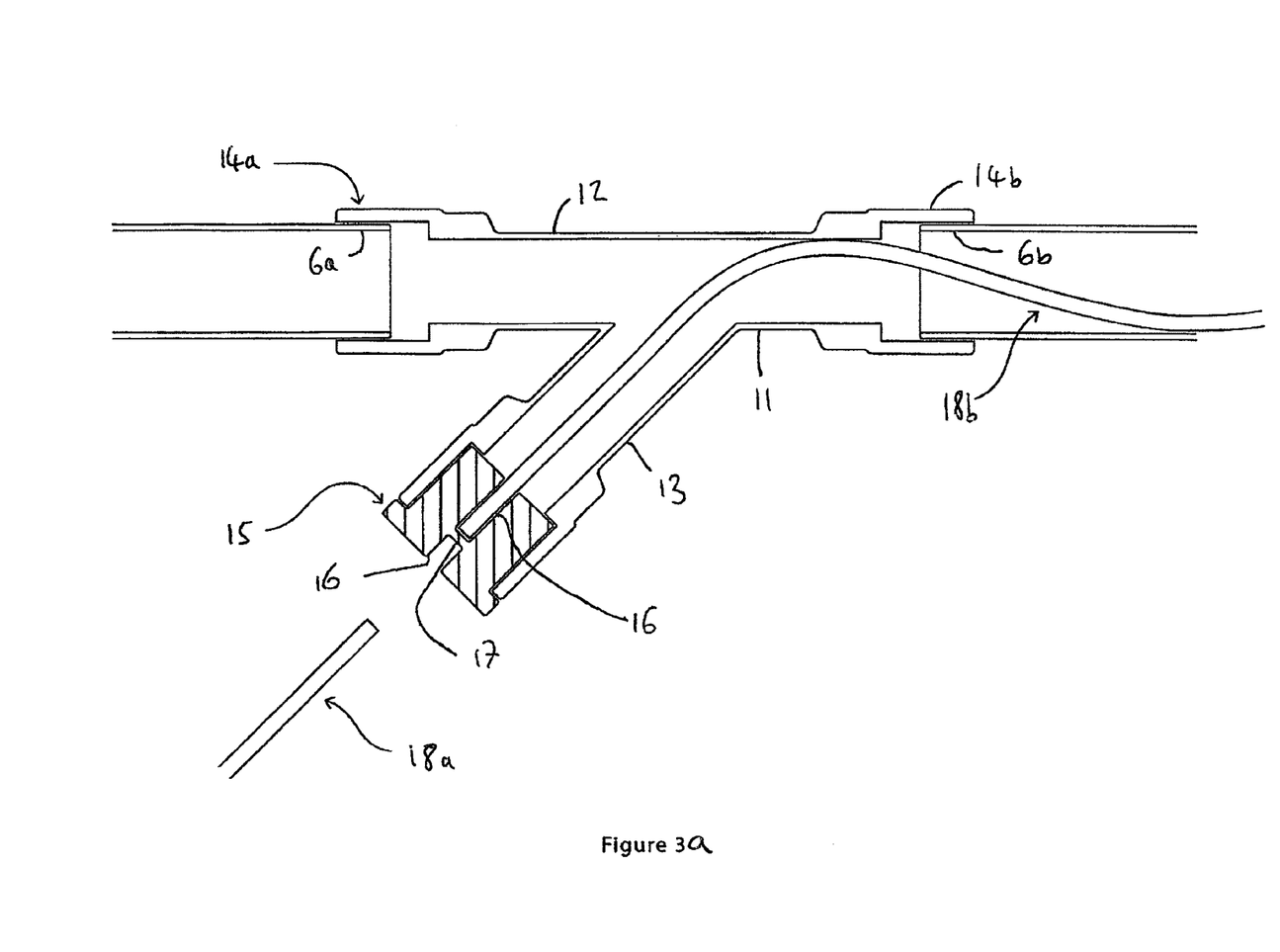
FIG. 3a is a schematic illustration of an embodiment of a Y-junction according to the present invention used to introduce or remove the cable from the pipe.

Turning now to FIG. 3a, the Y-junction 10 comprises a leg 11 and two arms 12 and 13. Leg 11 and arm 12 are aligned along a common axis. Arm 13 projects from the Y-junction at a small angle to the common axis. The ends of leg 11 and arm 12 are open and provided with compression fittings 14a, 14b. These allow the Y-junction to be fitted to open ends 6a, 6b facing a gap 6g in water supply pipe 6. When connected thus, a water flow path is provided between 6a and 6b along leg 11 and arm 12.

The arm 13 is capped with an end cap 15. The end cap 15 additionally incorporates a cable passage 16 which allows a cable to pass therethrough. In the illustrated embodiment, the cable is provided within a microduct tube 18. The microduct tube has separate sections (here labelled 18a and 18b) on either side of the end cap 15. A narrow neck 17 is provided with a small hole through which the cable rather than the microduct tube 18 can pass. The end cap 15 and the cable passage 16 may be formed of or lined with a resilient material such that it forms a seal with the walls of arm 13 and a seal around the microduct tubes 18a, 18b, thus preventing the escape of water. In order to facilitate this, the diameter of the cable passage 16 may be matched to the expected diameter of the microduct tubes 18a, 18b.

Figure 3B:
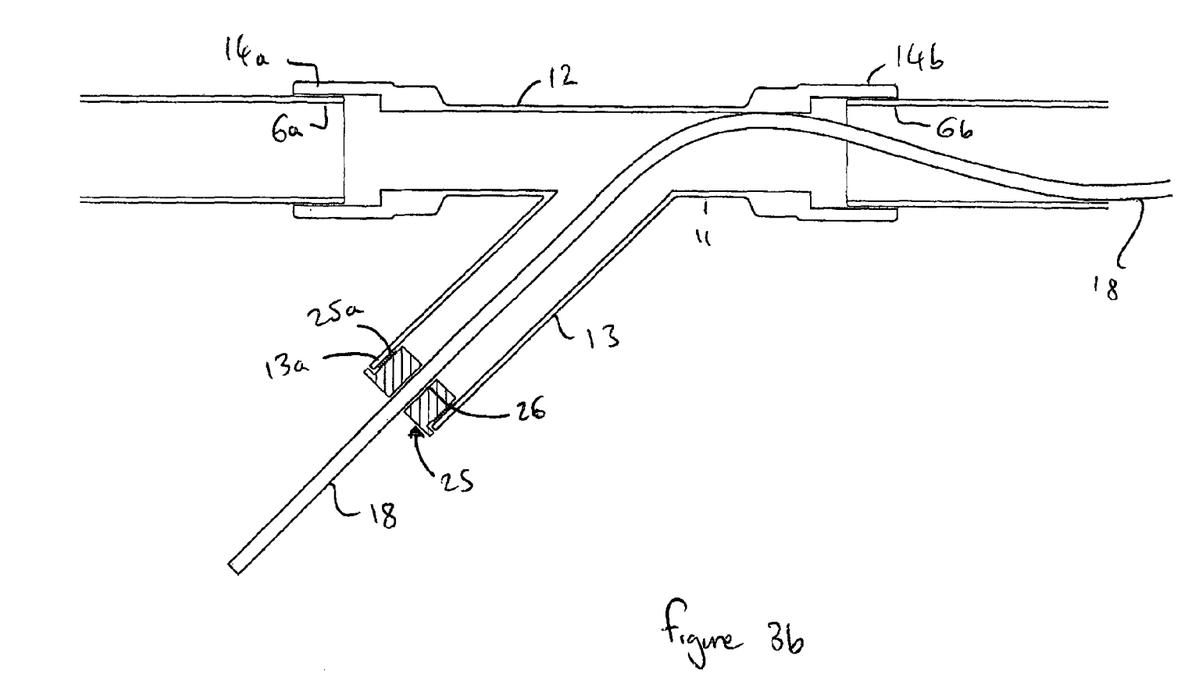
FIG. 3b is a schematic illustration of an alternative embodiment of a Y-junction according to the present invention.

A number of variations on the basic structure of the Y-junction 10 are possible. In particular, these might relate to the projecting arm 13 and the end closure thereof. Turning to FIG. 3b, the end closure 25 is a simple bung having a cable passage 26 therethrough, which allows a cable within a microduct tube 18 to pass therethrough. The bung 25 and the cable passage 26 may be formed of or lined with a resilient material such that it forms a seal with the walls of arm 13 and a seal around the microduct tube 18 thus preventing the escape of water. In order to facilitate this, the diameter of the cable passage 26 may be matched to the expected diameter of the microduct tube 18. The example bung 25 illustrated is provided with a threaded outer surface 25a adapted to interconnect with a thread 13a provided on projecting arm 13. It is of course possible that a bung 25 without such a thread may be substituted if desired.

Figure 3C:
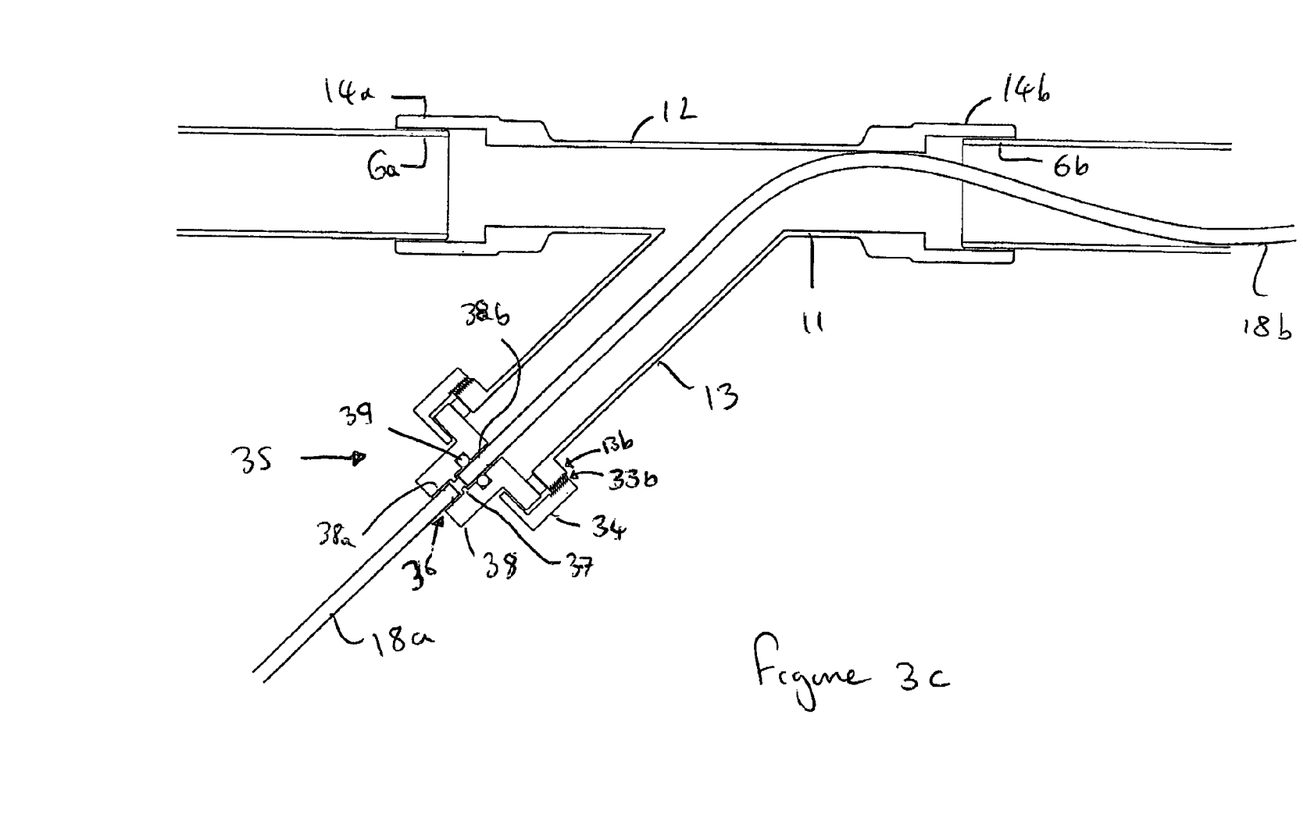
FIG. 3c is a schematic illustration of another alternative embodiment of a Y-junction according to the present invention.

In FIG. 3c a more complex closure arrangement 35 is shown. In such an example, an end cap 38 is retained in position by a sleeve 34. the sleeve 34 is provided with a thread 33b which engages with a thread 13b provided on the outside of the projecting arm 13. The end cap 38 has a passage 36 which allows a cable to pass therethrough. In the illustrated embodiment, the cable is provided within a microduct tube 18. The microduct tube has separate sections (here labelled 18a and 18b) on either side of the end cap 38. A narrow neck 37 is provided with a small hole through which the cable rather than the microduct tube 18 can pass. The end cap 38 and the cable passage 16 may be formed of or lined with a resilient material such that it forms a seal with the walls of arm 13 and a seal around the microduct tubes 18a, 18b, thus preventing the escape of water. In order to facilitate this, the diameter of the cable passage 36 may be matched to the expected diameter of the microduct tubes 18a, 18b. Additionally, barbs or wedge projections 38a, 38b may be provided to engage the microduct tubes 18a, 18b and help maintain them in position. Furthermore, an O-ring 39 may be provided to improve the seal.

Figure 3D:
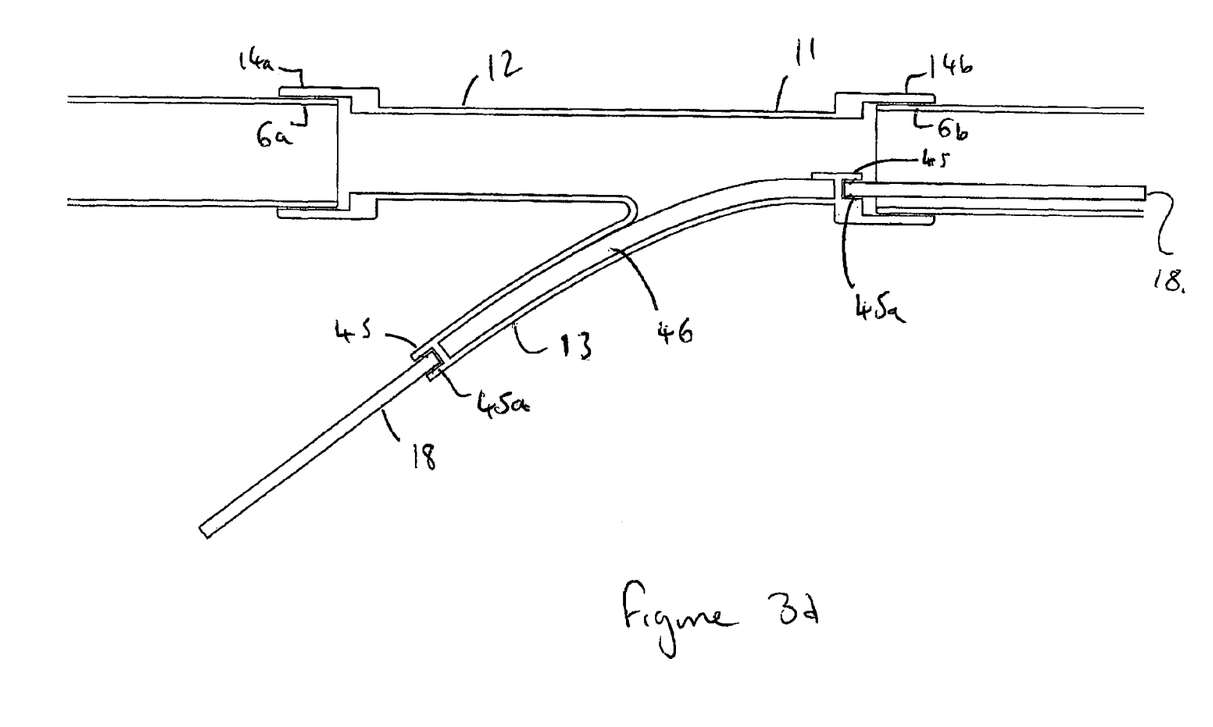
FIG. 3d is a schematic illustration of a further alternative embodiment of a Y-junction according to the present invention.

A further embodiment is shown in FIG. 3d. In this embodiment, the arm 13 is of considerably narrower diameter than arms 11, 12, such that it tightly encloses a cable passage 46 in the form of a duct adapted to fit around microduct 18. The microduct 18 enters and leaves the cable passage 46 via ends 45. The ends 45 are provided with barbed or wedged projections to improve the sealing and help retain the microduct 18 securely in position.

In some versions of the above embodiments, the cable passage 16, 26, 36, 46 may be adapted to receive a bundle of microduct tubes 18 or a plurality of cable passages 16, 26, 36, 46 can be provided each operable to receive a single microduct tube 18 from a bundle of microduct tubes 18.

The microduct tube 18 is typically of around say 4 mm in diameter and is formed of an inert material such as HDPE (high density polyethylene) or similar. This prevents the water in pipe 6 being contaminated by the microduct tube 18 and prevents the water affecting the transmission of data along cable. The cable within the microduct tube 18 is typically an optical fibre and may be a multicore optical fibre. Such a cable having say 2-4 cores might have an external diameter in the range 2-3 mm In alternative embodiments, a cable provided with a suitable inert insulating coating may be directly inserted through a suitable cable passage 16 and the microduct tubes 18 omitted. The cable is typically an optical fibre and may be a multicore optical fibre. Such an insulated cable having say 2-4 cores might have an external diameter in the range 2-5 mm.

In order to allow cable to be laid along pipe 6, a method according to the present invention may be used. The method comprises the steps of turning off the water supply to pipe 6 using stopcocks 3 and 5. The next step is exposing a section of pipe 6 at location 10a and making a pair of cuts in pipe 6. Once the cuts are made, the section of pipe 6 lying between said cuts is removed leaving a gap 6g. This process is repeated adjacent to the building 1 at location 10b to leave a second gap 6g. In alternative embodiments, if the building 1 has a suitable form such as a cellar wherein the pipe 6 is exposed this location may be within the building 1.

A cable is then laid along the section of pipe 6 between 10a and 10b, either directly or through a microduct tube 18b. Y-junctions 10 are inserted in the gaps 6g in pipe 6. The cable is threaded through the cable passages 16 provided in the end caps 15. The Y-junctions 10 are then sealed on to the ends of the pipe 6a, 6b facing the gaps using compression fixtures 14a, 14b. At this point the water supply to the pipe 6 can be switched back on.

One end of the cable may then be connected to cable junction box 7 provided adjacent to or in the path of trunk cable 4. The other end of the cable may then be connected to suitable equipment within the building 1. In many cases, the cable may be removed from the pipe 6 outside but adjacent to the building 1 and enter the building 1 through a suitable hole provided in an external wall.

It is of course to be understood that the invention is not to be restricted to the details of the above embodiments which have been described by way of example only.

The invention claimed is:

1. A method of laying a branch cable between a trunk cable and a desired node location comprising the steps of: locating a water-supply pipe for the node location adjacent to the trunk cable; introducing the branch cable into the water-supply pipe along a microduct tube; passing the branch cable along the water-supply pipe; and removing the branch cable from the water-supply pipe adjacent to the node location; the introduction or removal of the cable from the water-supply pipe being enabled by the provision of a cable transfer means, said cable transfer means comprising: a Y-junction inserted into a gap provided in the water-supply pipe, a leg and a first arm of the Y-junction having open ends adapted to be connected to the water-supply pipe; and a second arm capped with an end closure having a cable passage provided therethrough, the cable passage allowing the passage of said microduct tube but prevents the passage of water alongside said microduct tube, wherein the second arm is of considerably narrower diameter than the first arm and the leg such that it tightly encloses a cable passage in the form of a duct adapted to fit around the microduct.

2. The method as claimed in claim 1 wherein the method comprises the step of connecting the branch cable directly to the trunk cable and connecting the branch cable to the node location.

3. The method as claimed in claim 2 wherein the branch cable enters the water supply pipe adjacent to the junction box.

4. The method as claimed in claim 2, wherein the branch cable is connected directly to suitable equipment at the node location.

5. The method as claimed in claim 2 wherein the cable is removed from the water-supply pipe adjacent to a building within which the node is provided and the cable is passed through an entry passageway to be connected to the node location within the building.

6. The method as claimed in claim 2 wherein the cable is removed from the water-supply pipe within a building within which the node location is provided.

7. The method as claimed in claim 6 wherein the cable enters and/or leaves the water-supply pipe between a main side stopcock and a dedicated building stopcock.

8. The method as claimed in claim 1 wherein the open leg and first arm of the Y-junction are connected to the water-supply pipe via fittings adapted to seal the Y-junction to the water-supply pipe.

9. The method as claimed in claims 1 wherein the method incorporates the step of forming a gap in the water-supply pipe.

10. The method as claimed in claim 9 wherein the gap is formed by use of cutting equipment.

11. The method as claimed in claim 1 wherein the trunk cable is laid according a method comprising the steps of: laying a cable through one or more lengths of sewer between the two points; and where there is no nearby and accessible length of sewer or a discontinuity between nearby and accessible lengths of sewer, providing a length of dedicated cable conduit between said lengths of sewer and laying said cable through said dedicated cable conduit.

12. The method as claimed in claim 11 wherein the trunk cable is laid through the sewer using techniques selected from the group consisting essentially of: laying the cable loose in the flow channel of the sewer; pinning the cable to the walls of the sewer; and/or passing the cable through a duct provided in the sewer.

13. The method as claimed in claim 12 further comprising the steps of: installing a cable guide at points where the cable enters and/or exits the flow channel, and installing the cable guides at points where the cable is required to enter or leave the sewer and on either side of points where a cable in the flow channel is likely to lie across the direction of flow of fluids.

14. The method as claimed in claim 11 wherein the cable conduit is provided by a technique involving: digging a trench, laying the cable in the trench and filling the trench.

15. The method as claimed in claim 11 wherein sealing means are provided at points wherein the cable exits a sewer, to prevent the escape of noxious gases from the sewer.

16. The method as claimed in claim 1 wherein the open arm and the leg of the Y-junction are provided in along a common linear axis.

17. The method as claimed in claim 1 wherein the cable passage is adapted to allow the passage of a bundle of cables.

18. The method as claimed in claim 1 wherein the method comprises the step of connecting the branch cable to the trunk cable via a junction box and connecting the branch cable to the node location.

19. The method as claimed in claim 18 wherein the branch cable travels along a conduit between the junction box and the water-supply pipe.

20. The method as claimed in claim 18, wherein the branch cable is connected to a junction box allowing one or more devices to be connected to the network.

21. The method as claimed in claim 11 wherein sealing means are provided at both ends of a duct carrying the cable between the sewer and the dedicated conduit, to prevent the escape of noxious gases from the sewer.

* * * * *